No. 836,552. PATENTED NOV. 20, 1906.
T. ALLATT.
CANDY MACHINE.
APPLICATION FILED MAR. 21, 1906.

5 SHEETS—SHEET 1.

WITNESSES:

INVENTOR
Thomas Allatt.
BY
ATTORNEYS

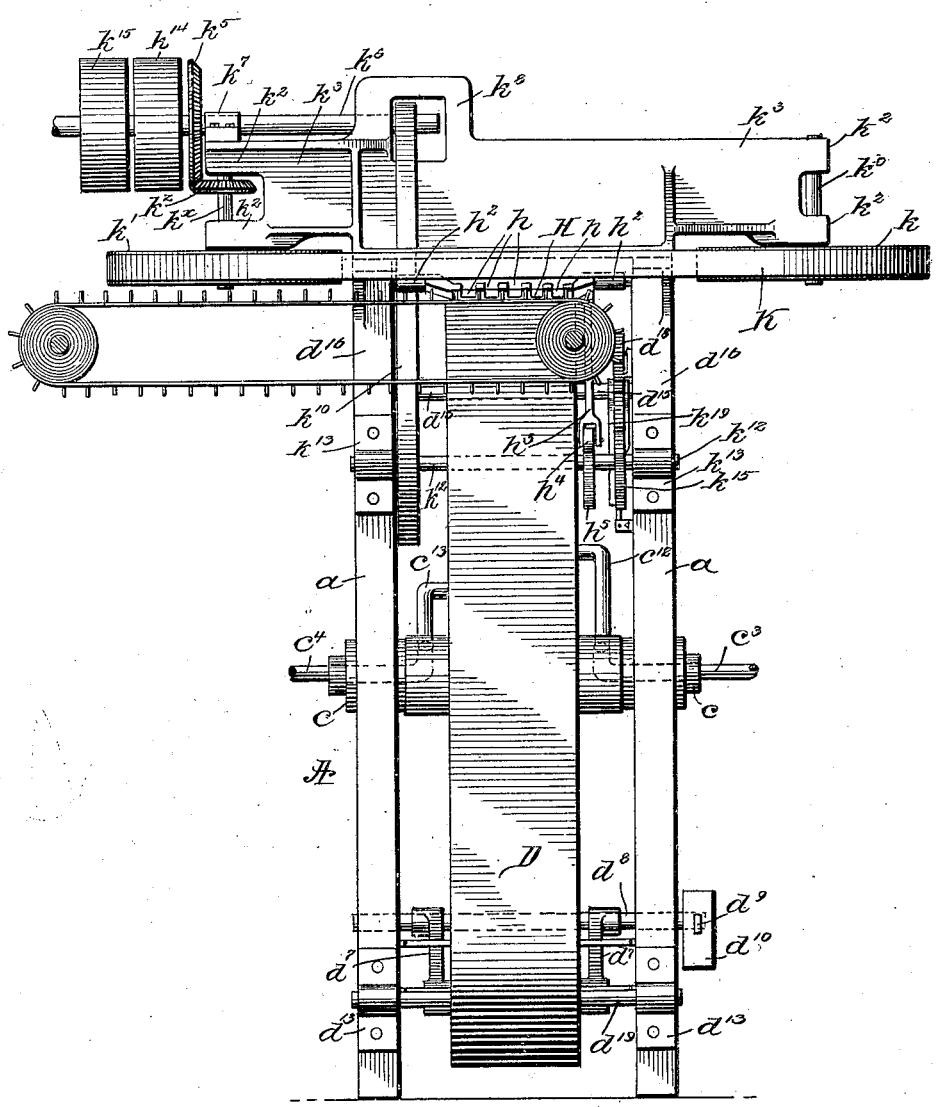

No. 836,552. PATENTED NOV. 20, 1906.
T. ALLATT.
CANDY MACHINE.
APPLICATION FILED MAR. 21, 1906.
5 SHEETS—SHEET 3.
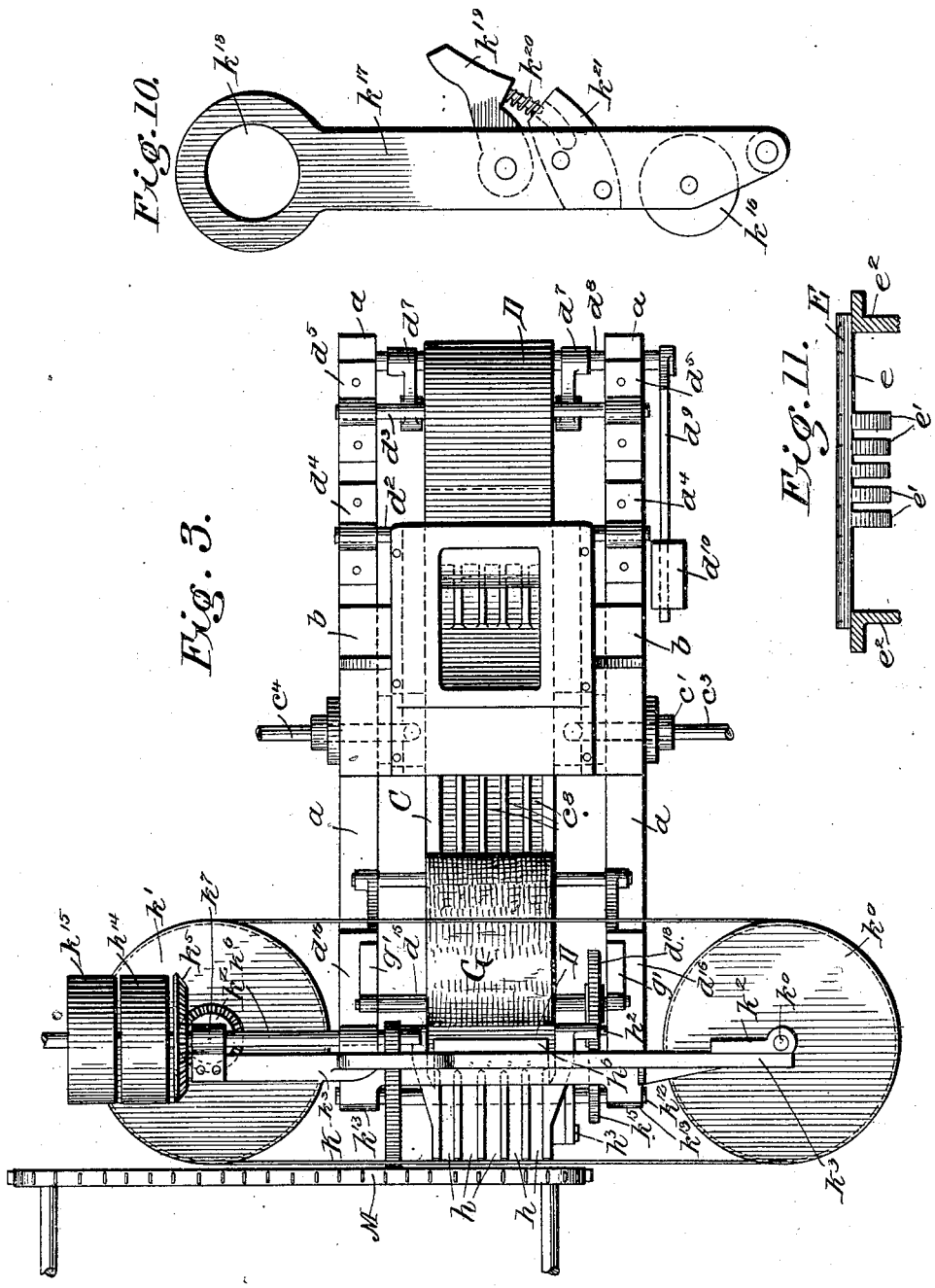
WITNESSES:
INVENTOR
Thomas Allatt
BY Munn & Co.
ATTORNEYS No. 836,552. PATENTED NOV. 20, 1906.
T. ALLATT.
CANDY MACHINE.
APPLICATION FILED MAR. 21, 1906.

5 SHEETS—SHEET 4.

WITNESSES:

INVENTOR
Thomas Allatt.
BY
ATTORNEYS

No. 836,552. PATENTED NOV. 20, 1906.
T. ALLATT.
CANDY MACHINE.
APPLICATION FILED MAR. 21, 1906.

5 SHEETS—SHEET 5.

WITNESSES:

INVENTOR
Thomas Allatt.
BY
ATTORNEYS

UNITED STATES PATENT OFFICE.

THOMAS ALLATT, OF PORTLAND, OREGON, ASSIGNOR TO PACIFIC COAST BISCUIT COMPANY, OF PORTLAND, OREGON.

CANDY-MACHINE.

No. 836,552.  Specification of Letters Patent.  Patented Nov. 20, 1906.

Application filed March 21, 1906. Serial No. 307,207.

*To all whom it may concern:*

Be it known that I, THOMAS ALLATT, a citizen of Canada, and a resident of Portland, in the county of Multnomah and State of Oregon, have invented certain new and useful Improvements in Candy-Machines, of which the following is a specification.

My invention is an improvement in candy-machines; and it consists in certain novel constructions and combinations of parts hereinafter described and claimed.

Figure 1:
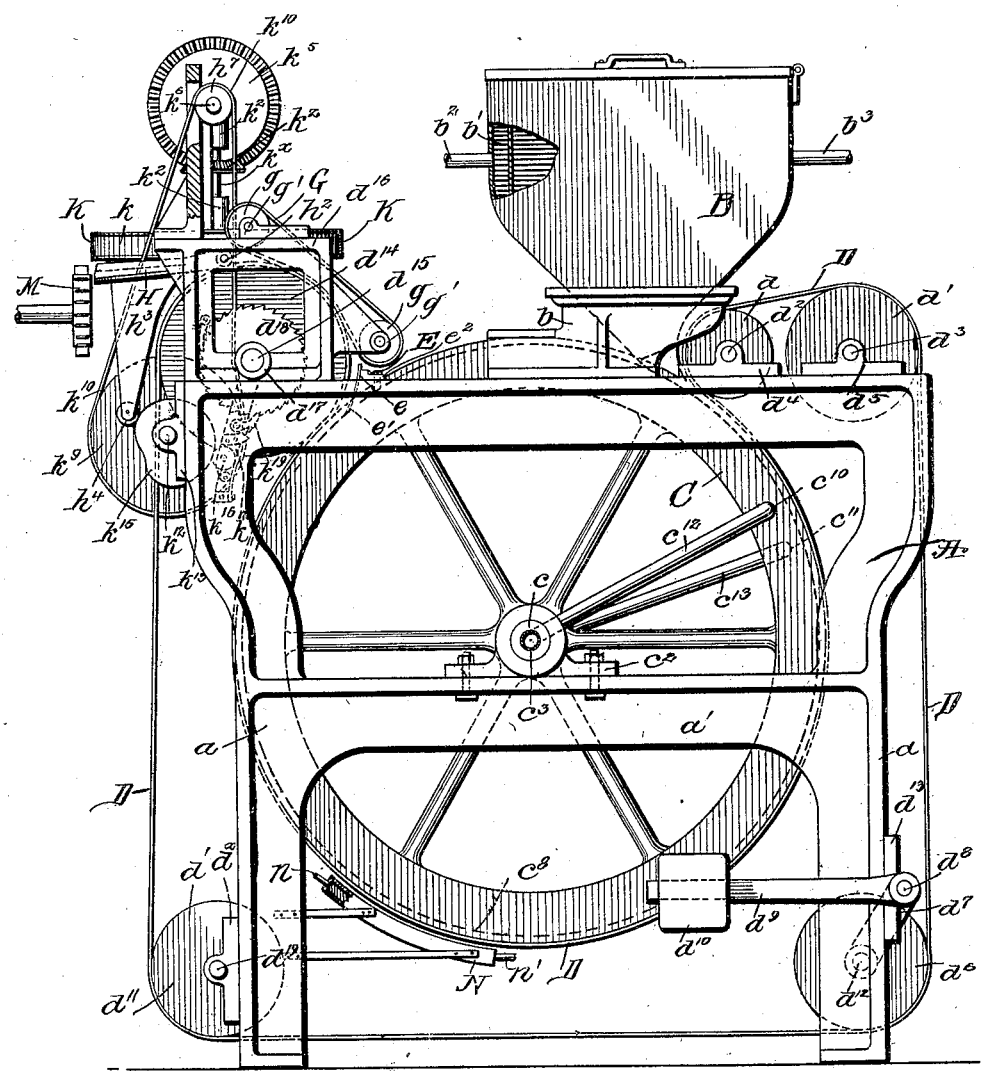
Figure 6:
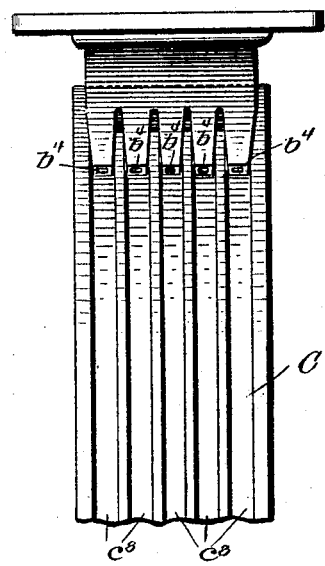
Figure 5:
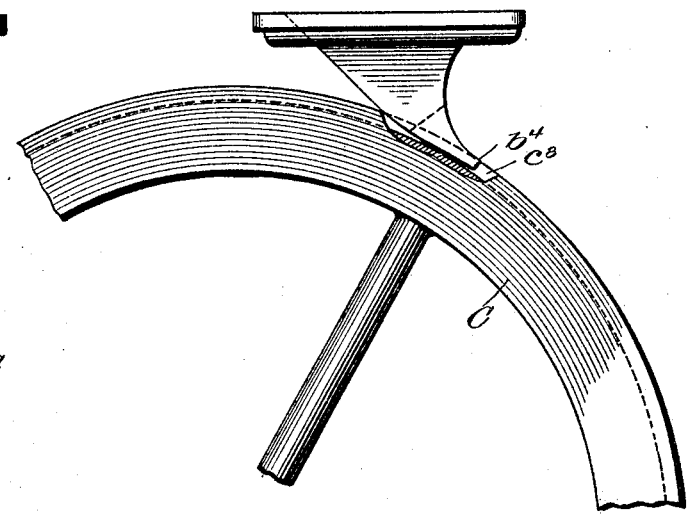
Figure 4:
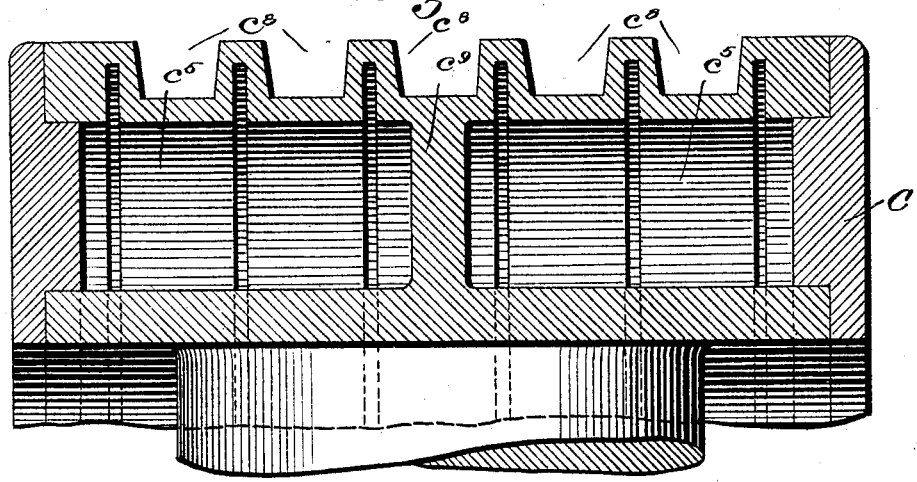
Figure 7:
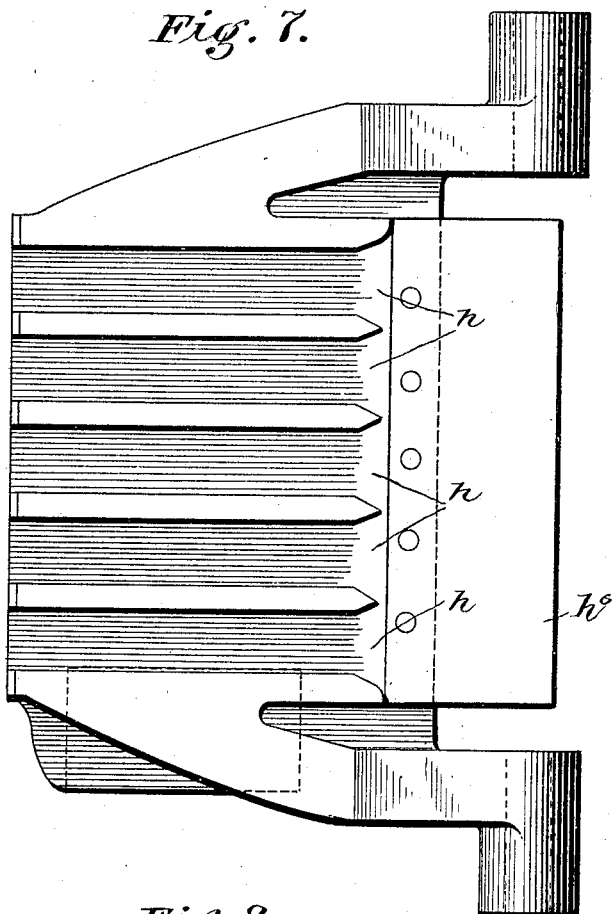
Figure 8:
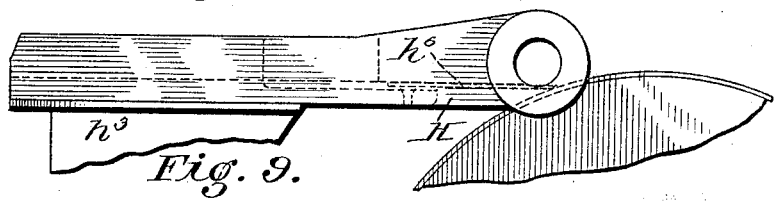
Figure 9:
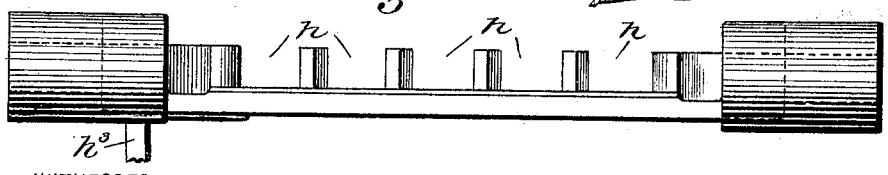

Referring to the drawings forming a part hereof, Figure 1 is a side view of my improvement. Fig. 2 is an end view. Fig. 3 is a top plan view. Fig. 4 is a transverse section of the rim of the cooling-wheel. Fig. 5 is a side view of a portion of the cooling-wheel and a portion of the candy-pan. Fig. 6 is a front view of Fig. 5. Fig. 7 is a plan view of the receiving-table. Fig. 8 is a side view of the same. Fig. 9 is a rear view of said table. Fig. 10 is a detail side view of the operating-pawl, and Fig. 11 is a front view of the stripper.

In the practical application of my invention, I provide a frame A, comprising the side plates $a$, connected together by a plurality of shafts to be hereinafter described.

A molding or cooling wheel C is secured upon a shaft $c$, journaled in bearings $c^2$, arranged upon intermediate bars $a'$ of the side plates, a portion of the periphery of the wheel projecting above the side plates. The wheel C is provided with a relatively wide peripheral surface having a plurality of parallel circumferential grooves $c^8$, and the rim of the wheel is hollowed out, as at $c^5$, the said hollow being provided with a partition $c^9$, having upon each side thereof openings $c^{10}$ $c^{11}$, one of said openings being upon one side of the wheel and the other upon the other side. The ends of the shaft $c$ are recessed at $c'$ for the reception of pipes $c^3$ $c^4$, and the recesses are connected by pipes $c^{12}$ $c^{13}$ to the openings $c^{10}$ $c^{11}$ in the rim. By this arrangement a cooling fluid is supplied to the rim of the wheel, the cooling fluid entering at one of the pipes $c^{12}$ $c^{13}$, circulating through the hollow rim and passing out through the other pipe at the opposite end of the shaft.

A candy-pan B is supported upon a bracket $b$, connected with the frame, and is arranged adjacent to one side of that portion of the periphery of the wheel which projects above the frame. The pan B is provided with a steam-jacket $b'$, connected to a source of steam-supply by supply and discharge pipes $b^2$ $b^3$, and is provided in its bottom with a transverse series of openings $b^4$, the said openings being funnel-shaped or of greater cross-section at their upper ends than at their lower and corresponding in number and position to the grooves $c^8$ of the molding-wheel.

A steel band D of a width equal to that of the peripheral surface of the wheel is arranged to travel in contact with that portion of the peripheral surface of the wheel within the frame, the said band being mounted upon a series of rollers $d$, $d'$, $d^6$, $d^{11}$, and $d^{14}$, journaled in the frame. The roller $d$ is secured to a shaft $d^2$, journaled in bearings $d^4$, mounted upon the upper edges of the side plates adjacent to the candy-pan, and the roller $d'$ is secured to the shaft $d^3$, journaled in bearings $d^5$ at the upper front corners of the frame. The roller $d^6$ is journaled upon a shaft $d^{12}$, supported by arms $d^7$ of a rock-shaft $d^8$, journaled in bearings $d^{13}$ at the lower front corner of the frame, the said shaft being provided with a substantially horizontal arm $d^9$, upon which is movably mounted a weight $d^{10}$. The above-described mechanism, including the roller $d^6$, is a tension device for the steel band D. The roller $d^{11}$ is secured to the shaft $d^{19}$, journaled in bearings $d^x$ at the lower rear corner. The roller $d^{14}$ is secured to a shaft $d^{15}$, journaled in bearings $d^{17}$ in brackets $d^{16}$, secured to the upper rear corners of the frame, the said shaft being also provided with a ratchet-wheel $d^{18}$, to be hereinafter described. The steel band D is arranged in contact with that portion of the peripheral surface of the molding-wheel below the upper edge of the frame and passes over the rollers $d$, $d'$, $d^6$, $d^{11}$, and $d^{14}$.

A stripper E, comprising a curved plate $e$, having on its free end a plurality of fingers $e'$ corresponding in number and position to the grooves on the molding-wheel, is secured to brackets $e^2$, connected with the frame adjacent to the point where the band D leaves the peripheral surface of the molding-wheel to pass outwardly over the roller $d^{14}$, the fingers of the stripper extending into the grooves of the molding-wheel for deflecting the cooled strips of candy from the said grooves. The strips of cooled candy follow the course of the band D over the roller $d^{14}$ and are retained in contact with the band and in proper position by means of a cloth belt G, supported by rollers $g$, journaled in bearings $g'$, arranged upon the brackets $d^{16}$.

A table H, having in its upper surface a plurality of grooves $h$ corresponding in number and position to the grooves of the molding-wheel, is hinged at one end, as at $h^2$, to the brackets $d^{16}$, the outer end of the table being provided with depending arms $h^3$, having friction-rollers $h^4$, for a purpose to be hereinafter described. The edge of the table adjacent to the roller $d^{14}$ has secured thereto a stripping-blade $h^6$, the said blade having its free edge resting upon the band D to strip the candy therefrom. The strips of candy passing out from between the cloth belt and the steel band D are received within the grooves of the table and move outwardly therein.

A knife K, comprising an endless steel band, is supported upon horizontally-arranged pulleys $k\ k'$, secured to the shafts $k^o\ k^x$, journaled in bearings $k^2$ upon brackets $k^3$, projecting laterally from each side of the frame, the upper end of the shaft $k^x$ being provided with a bevel-gear $k^z$, meshing with a gear-wheel $k^5$ upon a transverse shaft $k^6$, journaled in bearings $k^7$ upon the bracket $k^3$ arising from the frame, the outer end of the shaft being provided with fast and loose pulleys $k^{14}\ k^{15}$, for a purpose to be hereinafter described. The rear run of the endless band-knife passes immediately above the outer edge of the table H, and the said table is lifted to bring the strips of candy passing over the said edge into contact with the knife at predetermined intervals by means of cam-wheels $h^5$ engaging the friction-rollers $h^4$ in the depending arms $h^3$. The cams $h^5$ are secured to a shaft $k^{12}$, journaled in bearings $k^{13}$ upon the side plates, the said shaft being also provided with a pulley $k^9$, connected by a belt $k^{10}$ with a pulley $h^7$ upon the transverse shaft $k^6$.

The molding or cooling wheel C is driven by the steel band D, which in turn is driven from the roller $d^{14}$ by means of a pawl $k^{19}$ engaging the ratchet-wheel $d^{18}$ and pivoted to the pawl-lever $k^{17}$, the said pawl-lever having an eye $k^{18}$ engaging the shaft $d^{15}$ and having in its lower end a friction-roller $k^{16}$, engaged by a cam $k^{15}$ upon the shaft $k^{12}$. The pawl $k^{19}$ is normally maintained in contact with the ratchet-wheel by means of a spring $k^{20}$, arranged between the pawl and the bracket $k^{21}$ upon the pawl-lever.

At the rear of the machine is arranged a transverse conveyer M, having its upper run on a level with the table H when said table is in its lowered position, the said conveyer being supported and driven in any suitable manner and adapted to receive the candy as it is pushed from said table.

In operation the candy is introduced into the pan B in a plastic state, it being maintained in this condition by the steam-jacket. The plastic candy passes out through the funnel-shaped openings in the bottom of the pan into the grooves $c^8$ of the cooling-wheel. The transverse shaft $h'$ is driven in any suitable manner and imparts rotation to the shaft $k^{12}$ through the belt $k^{10}$. By means of the pawl and ratchet intermittent motion is imparted to the shaft $d^{14}$, which in turn imparts an intermittent rotary motion through the steel band D to the molding-wheel. The strips of candy are retained in the grooves during the movement of the wheel by the wheel-band D and are cooled by the cooling fluid circulating through the hollow rim of the wheel. When the candy reaches the stripper, the strips are deflected from the grooves and pass upwardly from the roller $d^{14}$ to the table H, the strips being retained in proper position with respect to the roller by the cloth band. As the strips are pushed forward intermittently over the table the said table is lifted at predetermined intervals to sever the strips transversely, the length of the piece cut off being proportionate to the extent of each intermittent motion of the molding-wheel. When the pieces of candy are severed from the strip, they drop onto the conveyer M, by which they are removed from the machine. It is sometimes desirable to provide a cooling means for the belt G, and for this purpose I arrange a hollow casing N adjacent to the said band below the cooling-wheel, the casing conforming to the shape of the band and being arranged in contact therewith. The casing may be supplied with a cooling fluid from any suitable source by means of the supply and discharge pipes $n'\ n^2$. While I have shown the casing as being applied to that part of the band in contact with the cooling-wheel, it is evident that the said casing might be arranged to contact with the horizontal portion of the band or with either of the vertical portions thereof.

It will be evident from the description that considerable time and labor is saved in the use of my machine, since long exposure of the candy is not necessary to cool it nor is it necessary to size the strips. Every portion of the candy is utilized, there being no waste of any kind. The strips are also of uniform size throughout, and since they are cut at regular intervals the completed product is in the most convenient form for wrapping by the automatic wrapping-machine. While I have shown square grooves in the pan, it is obvious that the said grooves and openings might be of any other desired shape.

Having thus described my invention, what

I claim as new, and desire to secure by Letters Patent, is—

1. In a candy-machine, the combination with the frame, of a shaft journaled in the frame, a wheel having a hollow rim secured to the shaft, and having a portion thereof projecting above the frame, the peripheral surface of said wheel being provided with a plurality of circumferential parallel grooves, means for supplying a cooling fluid to the hollow rim, a candy-pan supported on the frame at one side of the projecting portion of the wheel, and having in the bottom thereof a plurality of funnel-shaped openings corresponding in number and position to the grooves of the wheel, a roller journaled on the frame adjacent to the pan, rollers journaled at the corners of the frame, a tension device for one of said rollers, a flexible band supported on the rollers, and contacting with that portion of the periphery of the wheel within the frame, a stripping device comprising a plate secured to the frame on the opposite side from the candy-pan, and fingers on the plate engaging the grooves of the wheel for deflecting the candy strips therefrom, a table hinged to the frame at one end for receiving the deflected strips, an endless band-knife supported above the table, means for intermittently moving the wheel, means for continuously moving the endless band-knife, means for elevating the free end of the table at predetermined intervals whereby to bring the candy strips into contact with the knife, and a conveyer for receiving the candy from the table.

2. In apparatus of the class described, the combination with the frame, of a wheel having a hollow rim journaled in the frame, and having on the peripheral surface thereof a plurality of parallel circumferential grooves, means for supplying plastic candy to the grooves, means for supplying a cooling fluid to the hollow rim, a band partially encircling the wheel whereby to retain the candy in the grooves during the cooling thereof, means for varying the tension of said band, a stripper for deflecting the cooled strips of candy from the grooves, a table for receiving said strips, means in connection with the table for cutting the strips transversely at predetermined intervals, and means connected with the band whereby to intermittently rotate said wheel.

3. In apparatus of the class described, the combination with the frame, of a wheel having a hollow rim journaled in the frame and having on the periphery thereof a plurality of parallel circumferential grooves, means for supplying plastic candy to the grooves, means for supplying a cooling fluid to the hollow rim, means for retaining the candy in the grooves during the cooling thereof, a stripper for deflecting the cooled strips of candy from the grooves, a table for receiving the deflected strips of candy, means for cutting the strips transversely at predetermined intervals, and means for intermittently rotating the wheel.

4. In apparatus of the class described, the combination with the frame, of a wheel having a hollow rim journaled in the frame and provided on its peripheral surface with a plurality of parallel circumferential grooves, means for supplying plastic candy to the grooves, means for supplying a cooling fluid to the hollow rim, means for retaining the candy in the grooves during the cooling thereof, means for deflecting the cooled candy in strips from the grooves, means for receiving said strips, means in connection with said receiving means for cutting the strips transversely at predetermined intervals, and means for imparting an intermittent rotary movement to the wheel.

5. In apparatus of the class described, the combination with the frame, of a wheel having the peripheral surface thereof provided with a plurality of parallel circumferential candy-receiving grooves, and journaled in the frame, means whereby to apply a cooling fluid to the rim of the wheel, means for supplying candy in a plastic state to the grooves, means for retaining the candy in the grooves during the cooling thereof, means for deflecting the cooled candy in strips from the grooves, means for cutting said strips transversely at predetermined intervals, and means for imparting intermittent rotary movement to the wheel.

6. In apparatus of the class described, the combination with a candy-receiving wheel having its peripheral surface provided with parallel circumferential grooves, of means for supplying plastic candy to the grooves, means for imparting an intermittent rotary movement to the wheel, means in connection with the wheel for cooling the candy, means for retaining the candy in the grooves during the cooling thereof, means for deflecting the cooled candy in strips from the groove, and means for cutting the strips transversely at predetermined intervals.

7. In apparatus of the class described, the combination with means for presenting plastic candy in strips of uniform cross-section, of a wheel having means on its peripheral surface for receiving and retaining the strips, means for imparting an intermittent movement of rotation to the wheel, means in connection with the wheel for cooling the candy during the movement thereof, means for deflecting the cooled strips from the wheel, and means for cutting the strips transversely at predetermined intervals.

8. In apparatus of the class described, the combination with means for presenting plastic candy in strips of uniform cross-section, of an intermittently-rotating wheel having means in connection with its peripheral surface for receiving and retaining the strips, means in connection with the wheel for cooling the strips during the movement thereof, and means for removing the strips from the wheel.

9. In apparatus of the class described, the combination with means for presenting plastic candy in strips of uniform cross-section, of an intermittently-rotating cooling-wheel having means in connection with the periphery thereof for receiving and retaining the strips, and means for removing the strips from the wheel.

10. In apparatus of the class described, the combination with means for presenting plastic candy in strips of uniform cross-section, of a cooling-wheel, said wheel having in connection with the peripheral surface thereof means for receiving and retaining the strips.

11. In apparatus of the class described, the combination with means for presenting plastic candy in strips, of an intermittently-rotating wheel having a circumferentially-grooved peripheral surface for receiving the strips, and means in connection with the wheel for cooling the strips.

12. In apparatus of the class described, the combination with means for presenting plastic candy in a strip, of a wheel having a peripheral surface for receiving the strips, and means in connection with the wheel for cooling the strips.

13. In apparatus of the class described, the combination with means for presenting plastic candy in strips, of a rotating cooling-wheel for receiving the strips, means for retaining the strips thereon during the rotation of the wheel, and means for removing the strips when cooled.

14. In apparatus of the class described, the combination with means for presenting plastic candy in a strip, of a rotating cooling-wheel for receiving the strips, and means for removing the strips from the wheel.

15. In apparatus of the class described, the combination with means for presenting plastic candy in strips, of means for supporting and cooling the strips comprising a rotating wheel, having a grooved peripheral surface.

16. In apparatus of the class described, the combination with means for presenting plastic candy in strips, of means for supporting and cooling the strips, comprising a rotating wheel, having a hollow rim for receiving a cooling fluid, and a grooved peripheral surface for receiving the strips.

17. In apparatus of the class described, the combination with means for presenting plastic candy in a strip, of means for supporting and cooling the strips, comprising a rotating wheel having a hollow rim for receiving a cooling fluid.

18. In apparatus of the class described, the combination with means for presenting plastic candy in strips, of means for supporting the strips comprising a wheel having a relatively wide peripheral surface for receiving the strips, and means in connection with the rim of the wheel for permitting the passage of a cooling fluid.

19. An apparatus of the class described, the combination with means for presenting plastic candy in strips, of an intermittently-rotating cooling-wheel, having a circumferentially-grooved peripheral surface for receiving the strips, and a stripper having fingers engaging the grooves for removing the cooled strips therefrom.

20. In apparatus of the class described, the combination with means for presenting plastic candy in strips, of a rotating cooling-wheel having a circumferentially-grooved peripheral surface for receiving the strips, and a band partially encircling said wheel for retaining the strips in the grooves.

21. In apparatus of the class described, the combination with means for presenting plastic candy in strips, of a rotating cooling-wheel, having a circumferentially-grooved peripheral surface for receiving the strips, and means for retaining the strips in the grooves, comprising a band engaging said peripheral surface and partially encircling the wheel, and means for regulating the tension of the band.

22. In apparatus of the class described, a rotating cooling-wheel, means for delivering a strip of plastic candy to the periphery of the wheel, and means for retaining the candy in contact with the periphery of the wheel between the delivering means and the discharging-point.

23. In apparatus of the class described, means for presenting plastic candy in strips, a rotating cooling-wheel for receiving the strips, means for retaining the strips on the wheel during the rotation thereof, a stripper for deflecting the strips from the wheel, a movable table for receiving the strips, an endless band-knife supported above the table, and means for raising the table at predetermined intervals whereby to bring the strips into contact with the knife.

24. In apparatus of the class described, the combination with means for presenting plastic candy in strips, of means for cooling the strips, a table having its upper surface provided with grooves for receiving the strips, a knife arranged transversely above the table, and means for lifting the table at predetermined intervals whereby to bring the strips into contact with the knife.

25. In apparatus of the class described, the combination with means for presenting plastic candy in strips, of means for cooling the strips, a table for receiving the strips from the cooling means, a knife arranged transversely of the table, and means for moving the table at predetermined intervals whereby to bring the strips into contact with the knife.

26. In apparatus of the class described, the combination with means for presenting plastic candy in strips, of means for cooling the strips, means for receiving the cooled strips from the cooling means, and means connected with the receiving means for cutting the strips transversely at predetermined intervals.

27. In apparatus of the class described, the combination with means for presenting plastic candy in strips, of a rotating cooling-wheel having a grooved peripheral surface for receiving the strips, a flexible band partially encircling said wheel, whereby to retain the strips thereon, and means for cooling the band.

28. In apparatus of the class described, the combination with means for presenting plastic candy in strips, of a rotating cooling-wheel having a relatively wide peripheral surface for receiving the strips, a flexible band partially encircling the wheel for retaining the strips thereon, and means for cooling the band.

29. In apparatus of the class described, the combination with means for presenting plastic candy in strips, a rotating cooling-wheel having a peripheral surface for receiving the strips, means connected with the wheel for cooling said peripheral surface, a flexible band partially encircling the wheel for retaining the strips thereon, and means for cooling the band.

30. In apparatus of the class described, the combination with means for presenting plastic candy in a strip, of a rotating cooling-wheel having a peripheral surface for receiving the strips.

THOMAS ALLATT.

Witnesses:
J. L. WICKERSHAM,
P. S. GUILFORD.